United States Patent [19]
Trimble et al.

[11] 3,826,923
[45] July 30, 1974

[54] SYSTEM FOR DETECTING OPENINGS IN OPAQUE OBJECTS

[75] Inventors: Robert M. Trimble, Pittsburgh; Nicolaas L. Brouwer, Apollo, both of Pa.

[73] Assignee: Aluminum Company of America, Pittsburgh, Pa.

[22] Filed: June 6, 1973

[21] Appl. No.: 367,320

[52] U.S. Cl............... 250/572, 356/237, 250/223 R
[51] Int. Cl. .......................................... G01n 21/32
[58] Field of Search...... 250/219 DF, 273 B, 223 R, 250/217 R, 562, 572; 356/237, 200

[56] References Cited
UNITED STATES PATENTS

| | | | |
|---|---|---|---|
| 2,892,951 | 6/1959 | Linderman | 250/219 X DF |
| 2,939,016 | 5/1960 | Cannon | 250/219 DF |
| 3,576,442 | 4/1971 | Nakamura | 250/223 B |
| 3,708,669 | 1/1973 | Work | 250/217 X |

Primary Examiner—Walter Stolwein
Attorney, Agent, or Firm—John P. Taylor

[57] ABSTRACT

Minute openings in opaque objects are detected by intermittent discharges of stored energy in the form of high intensity radiation of preselected wavelength range determined by the type of material used to form the opaque object and the smallest opening size which must be detectable.

7 Claims, 4 Drawing Figures

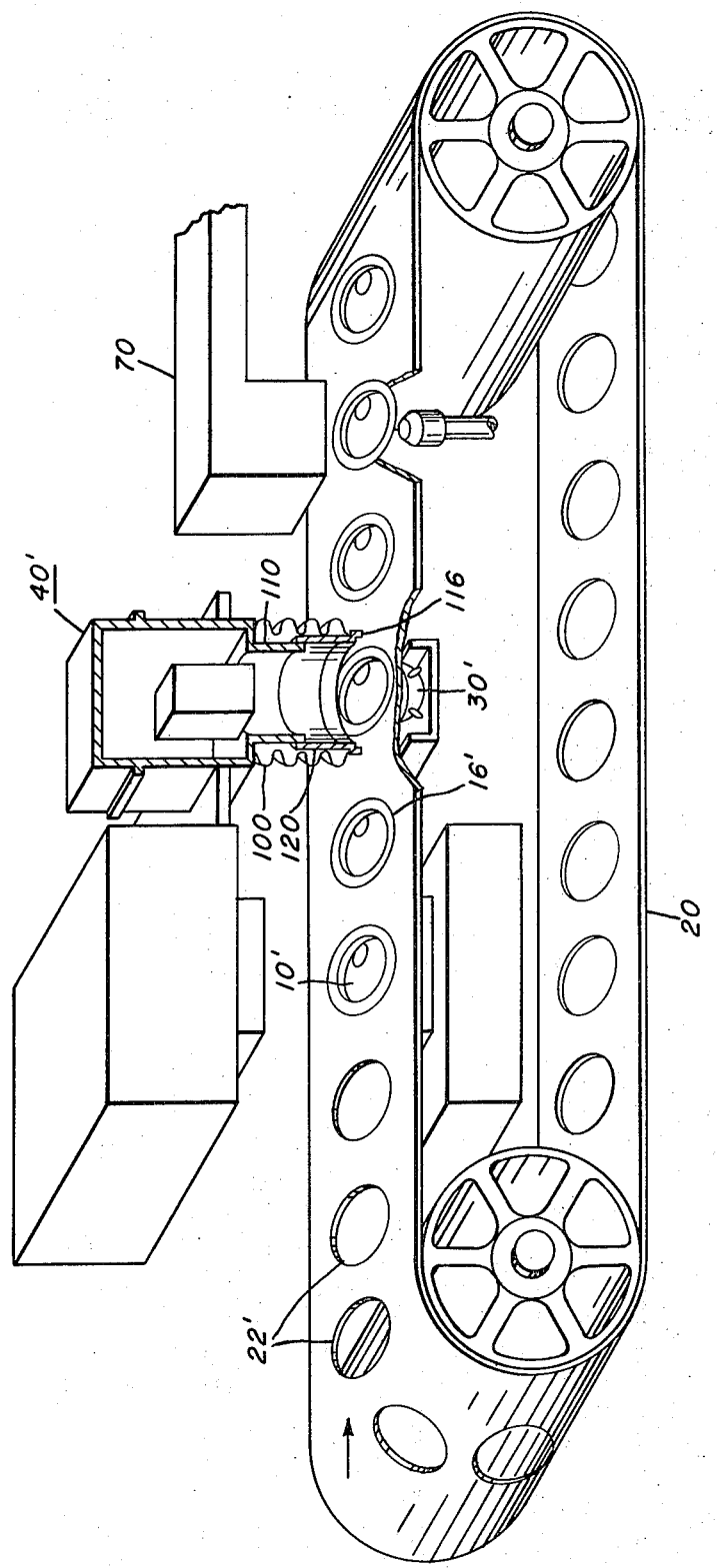

SYSTEM FOR DETECTING OPENINGS IN OPAQUE OBJECTS

BACKGROUND OF THE INVENTION

This invention relates to detection of openings in opaque materials. More particularly, this invention relates to the high speed detection of openings in opaque materials using stored energy intermittently released as high intensity electromagnetic radiation discharges of preselected ranges of wavelength and intensity.

The detection of holes in sheets and containers or the like is conventionally accomplished, for example, by shining a light on one side of the sheet or container and then either manually inspecting the opposite side for light emanating from openings or detecting the openings using photosensitive means such as a photoelectric cell or the like. More sophisticated detection means capable of detecting very fine openings such as vacuum, leak rate or penetrant testing devices are also available.

However, the light detection devices usually lack sufficient sensitivity to detect very fine openings while the latter devices are not practical from a standpoint of high speed analysis of items on a production line or the like.

While the light detection described above could undoubtedly be modified to increase sensitivity by providing some sort of storage or integration to accumulate the energy released by the small quantas of light to provide a sufficiently detectable level, such would sacrifice the speed which usually makes such a device more attractive than the other devices described above.

Recently, the utilization of light-weight, thin-walled objects such as aluminum containers for foods and medicants susceptible to attach from bacteria which may gain entrance through openings too small to be visible to the human eye has created a need for a system which can rapidly detect minute openings in solid materials without sacrificing either the speed or quality of the inspection.

SUMMARY OF THE INVENTION

It is therefore an object of the invention to provide means for accurately detecting minute openings in opaque objects at rates compatible with modern production line techniques.

This and other objects of the invention will be apparent from the description and drawings of the invention.

In accordance with the invention, openings in opaque objects are detected by subjecting the object to a discharge of stored energy in the form of electromagnetic radiation of very high intensity for a very short period of time and detecting any radiation which passes through openings in the opaque object. The radiation source and detection means respectively, emit and detect radiation of sufficiently short wave length to pass through openings which may be submicron in size, for example, as small as about 300 millimicrons, yet of sufficiently long wavelength that the object is opaque to the radiation.

BRIEF DESCRIPTION OF THE DRAWINGS

FIG. 3 is a side elevational view of a modified form of the invention as applied to inspection of discs or cylinder end caps.

DESCRIPTION OF THE PREFERRED EMBODIMENTS

Figure 1:
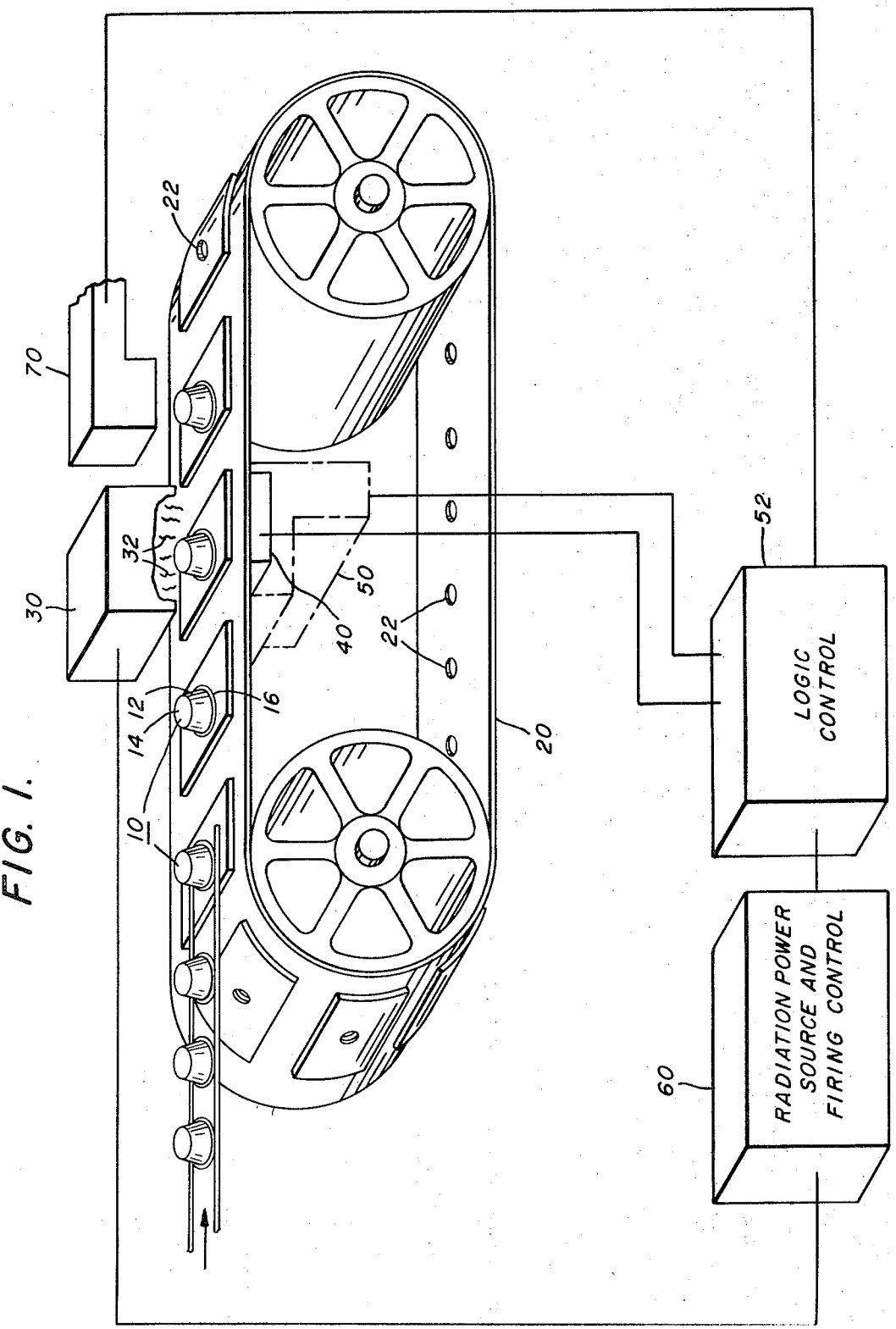
FIG. 1 is a side elevational view of the system partially in block diagram form as applied to a belt-type of conveyor mechanism for detecting openings in formed containers.

Turning now to the drawings and, in particular, to FIG. 1, a mechanism generally employing the system of the invention is illustrated. In the particular embodiment shown in FIG. 1, a formed container generally indicated at 10 having a conical sidewall 12 and a bottom wall 14 is carried on an endless belt 20 to a detection station wherein container 10 is exposed to a very short pulse of high intensity radiation from a source 30. Radiation source 30 is appropriately shaped by reflectors or other convenient means to bombard the container with radiation from various angles to expose all of the outer surfaces of the container to radiation. Belt 20 is formed with openings as at 22 which permit any radiation which passes through an opening in the container 10 to pass through the belt into a radiation detector 40. By providing the opening 22 in the embodiment illustrated, a vacuum means 50 located beneath the belt and around the radiation detector 40 can be used to provide a light-tight seal between belt 20 and lip 16 on container 10. If, as will be described later, such a light-tight seal is not needed, the opening 22 could be eliminated if the belt was selected to be transparent to the particular wavelengths of radiation which pass through the openings in container 10.

Control of the detection system is provided through a logic control 50 which is conveniently shown in block form. Logic control 50 controls the speed of the belt 20, the firing of radiation source 30 via power source control 60, and controls the reject mechanism 70. In operation of the system, the belt continuously moves the container over the radiation detector 40 and the vacuum box 50. The logic control interrogates the position of the container (such as with a photoelectric cell or the like not shown) as it passes over radiation detector 40 and vacuum box 50 to determine that there is a container in place over radiation detector 40. As belt 20 moves container 10 over vacuum box 50, the vacuum effects a seal between container 10 and belt 20 via opening 22 therein. After the seal is formed, the firing control is energized and a burst of high-intensity radiation is directed toward the outside surface of the container 10 as shown by the radiation waves 32. If the container has no openings therein, none of the radiation directed at the container from radiation source 30 will pass therethrough and radiation detector 40 will not provide a signal to the logic control, and container 10 passes on for further processing.

If, during the pulse from the high-intensity radiation source, some radiation passes through openings in container 10 and thence through opening 22 in belt 20, the radiation is detected by detector 40 and converted into an electrical signal by means well known to those skilled in the art. This signal is fed to the logic control mechanism which, in turn, activates reject mechanism 70. After the pulse, belt 20 continues to move container 10 on from the detection station to a position adjacent reject mechanism 70 which is then energized to remove the container from the belt.

While the system of the invention can be used, for example, as a portable analysis tool to determine the presence of opening in a single object, the radiation detector is particularly intended for use as shown in automated systems wherein each item will only be analyzed for a very short period of time. For example, in the system shown, it is contemplated that as many as 600 or more containers can be analyzed in 1 minute or 10 or more per second. Each container thus must be moved into position, vacuum sealed, irradiated, and moved off the detecting station in a period of approximately 1/10 second. Theoretically, the container can only be irradiated for up to 1/10 second and, of course, practically for only a much shorter period of time, probably only about 100 microseconds, or less since the container, as it is moved by the belt is only correctly aligned between radiation source 30 and detector 40 for a very short period of time.

Thus, for a given size opening in the container which may be as small as 300 millimicrons, the total quanta of radiation which may therefore pass through such a tiny opening in such a short period of time is very small. It is therefore necessary to provide a fast responding and sensitive radiation detector and to provide a high intensity of radiation. For example, a 100 watt source of radiation—on a continuous basis—provides 100 joules of energy per second. With an exposure time, for example, of only 100 microseconds, the total energy emanating from a 100 watt power source would only total 1/100 joules. It has been determined that to detect openings as small as 300 millimicrons in a period of time of 100 microseconds or less using conventionally available detection devices, a total energy of at least about one joule output is required. On a continuous basis, such a source, to provide energy of one joule in 100 microseconds, would require at least 10,000 watts (10,000 joules per second) of power which, in turn, would generate a high level of heat and would greatly shorten the life span of the radiation source.

In the actual practice of the invention, the actual irradiation time may be as short as 3 microseconds. Thus, to provide a total energy of at least one joule in this short period of time, a very high intensity of radiation is required, i.e., a source capable of emitting sufficient energy over the short irradiation period equivalent to over 300,000 watts which would be practically impossible to achieve or maintain on a continuous basis.

Figure 2:
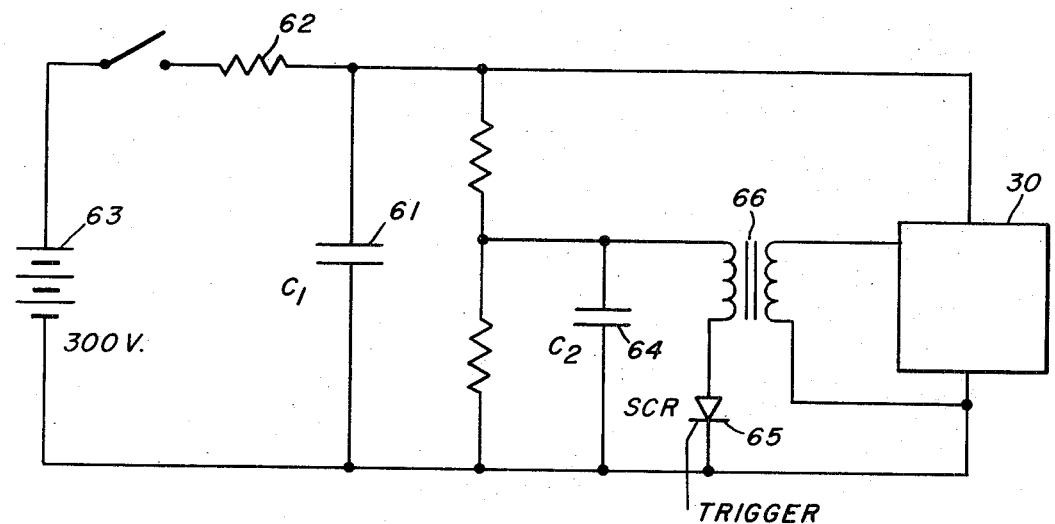
FIG. 2 is a schematic representative of a portion of FIG. 1.

Therefore, in accordance with a preferred embodiment of the invention, the radiation source is controlled by a capacitive discharge firing mechanism such as, for example, shown in FIG. 2, which stores energy and releases high energy pulses to the radiation source which, in turn, converts the stored energy into bursts of high-intensity radiation at the desired wavelengths of the spectrum.

As illustrated in FIG. 2, radiation source 30 may be fired by a capacitive discharge device wherein a capacitor 61 is charged through resistor 62 from a power source such as battery 63 or a source of rectified AC. A second capacitor 64 is also charged to a lower voltage by the same source. A switching device such as a silicon-controlled-rectifier (SCR) 65 in series with the primary winding of a transformer 66 is placed across capacitor 64. The secondary winding of transformer 66 is connected to the radiation source. A trigger signal from logic control means 50 is applied to the gate of SCR 65 biasing the SCR into conduction to thus discharge capacitor 64. The flow of current from capacitor 64 through the primary winding of transformer 66 causes the secondary winding to deliver a high voltage pulse to the radiation source. Radiation source 30, in the illustrated embodiment, comprises a gas-filled ionizable source, such as, for example, a xenon gas-filled source. The pulse from transformer 66 ionizes the xenon gas thus changing its resistance and causing capacitor 61 to discharge. It should, of course, be noted that the particular capacitive-discharge circuitry shown is for illustrative purposes only and, per se, forms no part of the invention. However, in accordance with the invention, the radiation source must include means for the storage of energy and the release of the stored energy as short high-intensity bursts of radiation as opposed to simply an intermittent or interrupted radiation source using, for example, a radiation chopper or the like. It should be further noted here that while a gas-filled ionizable radiation source has been described in the preferred embodiment, other radiation sources capable of storing energy for intermittent release are to be deemed to be within the scope of the invention.

In addition to the energy requirement of the radiation source, the frequency or wavelength of the emitted radiation is controlled to within certain frequencies to ensure the detection of various minute openings in the opaque object without, however, allowing the radiation to penetrate through the opaque material itself. This is particularly important when the material comprises thin-walled material of low density such as, for example, aluminum. While it is well known that certain dense materials such as lead or the like, if used in sufficient thickness, can block the passage therethrough of electromagnetic radiation of X-ray or gamma ray wavelengths, lighter materials such as light metals or the like are not opaque to such wavelengths. The selection of the wavelength band must therefore be made to exclude wavelengths which are short enough to pass through the solid portion of the particular object being analyzed. The use of the term opaque herein is not intended to define or exclude any particular shape such as a cup or container or the like but is intended to distinguish from materials which are transparent to the radiation frequencies used.

While we do not wish to be bound by any theory of operation, it is our belief that the detection of submicron size openings must be made using wavelengths in the order of the size of the opening to be detected. To therefore detect opening as small as 3 × 10 -7 meters or 300 millimicrons, we believe that radiation of equivalent wavelength, i.e., about 3,000 Angstroms, should be used.

In accordance with the invention, it has been found that a radiation source emitting radiation having a band width of from about 2,000 to 20,000 Angstroms and preferably having a majority of its emitted radiation of wavelength of about 2,000 to 4,000 Angstroms provides a radiation source of sufficiently short wavelength to penetrate submicron openings without penetrating through the walls of a container of, for example, a low density material such as aluminum foil thickness, i.e., less than about 0.0065 inches.

Selection of the frequency band can be made, for example, by proper selection of material to be excited in the radiation source.

The invention thus contemplates the use of a radiation source capable of storing energy and releasing the energy in the form of short bursts of high-intensity electromagnetic radiation of short wavelength. For the purpose of this invention, the term "high intensity" defines a source of electromagnetic radiation having sufficient intensity to emit a total energy of about one or more joules during a time interval of from about 3 to 100 microseconds. The duration of the pulse or burst of electromagnetic radiation is, in accordance with the invention, of about 3 to about 100 microseconds. The term "short wavelengths" are used herein, is intended to define wavelengths having a range of about 2,000 to 20,000 Angstroms with preferably a predominance of the radiation of wavelengths of about 2,000 to 4,000 Angstroms.

Turning now to FIG. 3, the invention is shown as applied to the detection of openings in disc-like members such as, for example, used to seal the end of a cylindrical container. In this embodiment, belt 20 is provided with a large opening 22' which is conveniently sized to approximate the diameter of the central or dished portion of disc 10'. In this embodiment, radiation source 30 is positioned beneath belt 20 while radiation detector 40 is located above belt 20. To prevent the entrance of ambient radiation or of portions of radiation from source 30 which does not pass through the disc 10', from exciting the detector a radiation sealing mechanism is used which comprises a bellows-like member 100 inside of which telescoping cylinders 110 and 120 are centrally positioned.

Belt 20 carries disc 10 into a detecting station that is positioned above radiation source 30 at which time belt 20 is stopped by control means 105 (not shown). At this point, the bellows portion 100 of radiation detector 40 is lowered until seal member 116' contacts the edge 16' of disc 10' to effect a light-tight seal thereagainst. In this regard, it should be noted that for convenience, the entire detector including the bellows means 100 may be raised and lowered into position. Preferably, however, the detector 40 remains stationary and only bellows means 100 are moved. The seal is then effected by a yielding or spring action provided by the bellows member 100 and the telescoping cylinders therein. This could further be enhanced, if necessary, by providing a coiled spring about inner cylinder 110 which would bear against the upper end portion of cylinder 120 to urge cylinder 120 downward.

After the light-tight seal is made between the bellows and disc 10', the radiation source is energized to fire a short burst of high-intensity radiation directed toward the undersurface of disc 10'. Radiation passing through any openings in disc 10' will be detected by radiation detector 40 which, in turn, will transmit a signal to the control means which will, in turn, energize rejection means (not shown) which may be similar to the system in FIG. 1. While the apparatus illustrated in FIG. 3 is intended to show another form of apparatus which may be utilized in the practice of the present invention, the particular apparatus forms no part of the present invention.

It should be noted that in this particular embodiment, no vacuum means are needed to provide a light-tight seal between the object to be analyzed and belt 20. It would therefore be possible in this embodiment to use a belt made of material that is transparent to the particular wavelengths of radiation emitted from source 30. The illustrated embodiment, however, is provided with openings 22' to simplify the positioning or location of disc 10' with respect to the radiation source and radiation detecting means. Such, however, could also be provided by placing raised portions on belt 20 as will be readily recognized by those skilled in the art.

Figure 4:
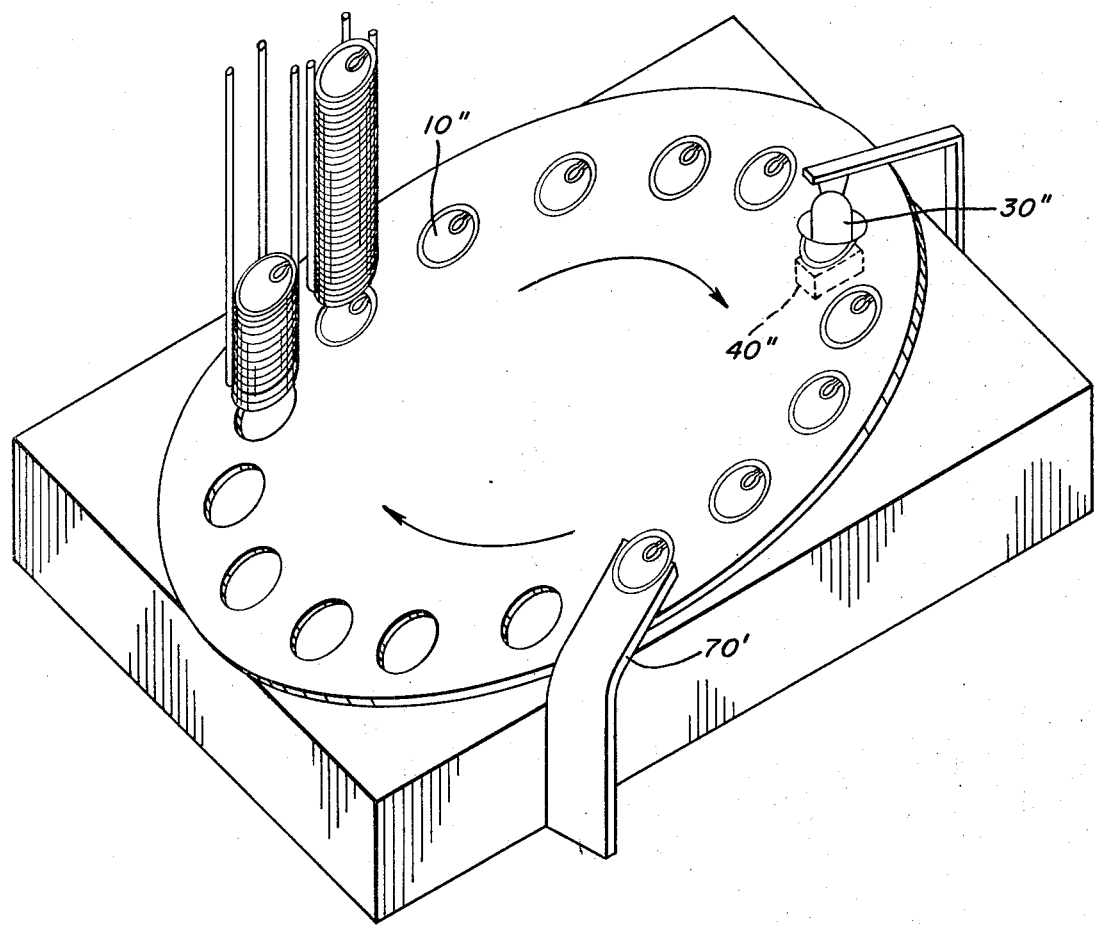
FIG. 4 is a partially cut-away isometric view of another form of the invention.

Turning now to FIG. 4, yet another embodiment is illustrated wherein a flat disc member 10" similar to 10' shown in FIG. 2 is carried on a multistation circular platform to a detection station comprising radiation source 30' which is positioned above disc 10" and a radiation detector 40' is positioned beneath the disc at that point. As in the systems previously described, movement of the disc to a detecting position is effected by energization of the transporting mechanism by control means (not shown). In this embodiment as in the embodiment illustrated in FIG. 1, the operation may be continuous, that is, the disc and the platform carrying the disc need not be stopped at the detecting station. Radiation source 30' emits a burst of high-intensity radiation of the desired wavelength and, if radiation passes through openings in the disc being analyzed, the radiation detector 40' transmits a signal to the control means which, in turn, energizes a reject mechanism at another station. When analyzed disc containing the undesired openings therein reaches the reject station, it is rejected. As shown in this embodiment, loading and unloading mechanisms or stations are provided side by side comprising the first and last stations of the cycle. Thus, the discs to be analyzed are stored in a first stack and then singly unloaded by means not shown which are well know to those skilled in the art and are moved around the various stations in the circle and returned finally to a stacking station. It should be further noted in this regard that while the stacking and unstacking mechanisms have been shown together with the stations to analyze the disc or openings and reject the disc, other stations may be used as well to provide other processing such as fabricating steps or coating steps as is well known to those skilled in the art.

In each of the illustrated embodiments, the control and sequencing of the steps has been referred to respectively as either logic means or control means. The use of such terms is intended to include various electronic circuits as well as mechanical sequencing means. Details of such means have not been shown as such are well known to those skilled in the art and such specific types of such controls form no part of the present invention.

Thus, the invention provides an improved means for analyzing the openings in opaque objects without requiring excessively long analysis time as would be required using vacuum, leak-rate, penetrant, or ordinary light means. It provides a highly selective range of radiation frequencies to determine the particular sized openings or range of openings which are to be rejected.

Use of such high-intensity radiation, as well as the selection of the frequency of the radiation, additionally provides means for enabling the analytical equipment to distinguish the emitted radiation from ambient radiation or background noise. It should be noted further in this regard that the detection equipment may be rendered even further selective by providing frequency sensitive filtering means on the detector.

While the invention has been described and illustrated in terms of particular embodiments, the claims appended hereto are intended to encompass all embodiments which fall within the spirit of the invention.

Having thus described our invention and certain embodiments thereof, we claim:

1. A system capable of detecting openings as small as 300 millimicrons in opaque materials, by releasing stored energy in the form of high energy electromagnetic radiation of selected wavelength which comprises means for storing energy and releasing about 1 joule of energy in the form of a short burst of high-intensity electromagnetic radiation of about 3–100 microseconds duration at least a portion of which is of sufficiently short wavelength to pass through an opening of about 300 millimicrons;
a body of material of sufficient thickness to provide opacity to the frequencies of electromagnetic radiation emanating from said source;
detection means to detect electromagnetic radiation passing through openings in said body; and
means for shielding said detection means from spurious radiation not passing through said body.

2. The system of claim 1 wherein said radiation wavelengths are from about 2,000 to 20,000 Angstroms.

3. The system of claim 2 wherein the wavelengths of at least one-half of said radiation are about 2,000 to 4,000 Angstroms.

4. The system of claim 1 wherein said radiation source comprises a gas-filled ionizable source.

5. The system of claim 4 wherein said radiation source is excited by an electric discharge of stored energy from a capacitive-discharge source.

6. The system of claim 4 wherein said gas-filled ionizable source comprises a xenon source.

7. A system for the detection of holes as small as 300 millimicrons in thin-walled aluminum bodies comprising:

a. means for storing energy;
b. radiation means utilizing said energy and comprising a gas-filled ionizable source emitting bursts of radiation at a wavelength range of from about 2,000 to about 20,000 Angstroms, at an intensity sufficient to provide a total energy of about 1 joule of energy during a time period of from about 3 to about 100 microseconds per burst;
c. radiation detection means responsive to the wavelengths emitted by said radiation source and having sufficient sensitivity to detect radiation of said recited intensity passing through an opening as small as 300 millimicrons;
d. means for positioning a thin-walled aluminum body between said radiation means and said radiation detection means;
e. means for isolating said detection means from said radiation source while said aluminum body is interposed therebetween to prevent radiation emitted from said source and not passing through holes in said aluminum body from reaching said detection means;
f. means for moving said aluminum body into a position between said radiation source and said detection means; means for triggering said radiation source to emit radiation when said aluminum body is properly positioned and said detection means have been isolated from said radiation source; and g. capacitive-discharge means coupled to said gas-filled ionizable source to store energy therein and to release said stored energy to said source to excite said source to convert said stored energy into a burst of high-intensity radiation.

* * * * *